United States Patent
Ericson et al.

(10) Patent No.: US 8,347,998 B2
(45) Date of Patent: ***Jan. 8, 2013

(54) WORKING MACHINE WITH ONE OR MORE ELECTRIC MACHINES FOR DRIVING, BRAKING, AND/OR GENERATING POWER AND A METHOD FOR OPERATING SUCH A WORKING MACHINE

(75) Inventors: Hans Ericson, Eskilstuna (SE); Joakim Unnebäck, Eskilstuna (SE); Sven-Åke Carlsson, Eskilstuna (SE); Reno Filla, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 985 days.

This patent is subject to a terminal disclaimer.

(21) Appl. No.: 12/089,184

(22) PCT Filed: Oct. 14, 2005

(86) PCT No.: PCT/SE2005/001539
§ 371 (c)(1),
(2), (4) Date: Apr. 3, 2008

(87) PCT Pub. No.: WO2007/043924
PCT Pub. Date: Apr. 19, 2007

(65) Prior Publication Data
US 2008/0264051 A1  Oct. 30, 2008

(51) Int. Cl.
*B60K 6/00* (2007.10)
(52) U.S. Cl. .............. 180/165; 180/53.4; 60/486; 477/5
(58) Field of Classification Search .................. 180/165, 180/53.4, 53.5, 6.48, 65.265, 65.275, 65.28, 180/65.31; 903/960; 37/348; 60/486; 477/5
See application file for complete search history.

(56) References Cited

U.S. PATENT DOCUMENTS

| | | | | |
|---|---|---|---|---|
| 4,898,078 A | * | 2/1990 | Gage et al. | 91/524 |
| 5,230,402 A | * | 7/1993 | Clark et al. | 180/307 |
| 5,415,603 A | * | 5/1995 | Tuzuki et al. | 477/5 |
| 5,488,787 A | * | 2/1996 | Aoyagi et al. | 37/348 |
| 5,490,081 A | * | 2/1996 | Kuromoto et al. | 700/178 |

(Continued)

FOREIGN PATENT DOCUMENTS
DE  19748423 A1  2/1999
(Continued)

OTHER PUBLICATIONS

Supplementary European Search Report for corresponding European App. 05 79 4507.

(Continued)

*Primary Examiner* — Katy M Ebner
*Assistant Examiner* — Brodie Follman
(74) *Attorney, Agent, or Firm* — WRB-IP LLP

(57) ABSTRACT

A working machine including an internal combustion engine for supplying torque to the driving wheels of the working machine, and a transmission line arranged between the internal combustion engine and the driving wheels for transmitting torque from the internal combustion engine to the driving wheels. The working machine further including at least one hydraulic pump in a hydraulic system for moving an implement arranged on the working machine and/or steering the working machine. The transmission line includes at least one electric machine for driving or braking the driving wheels, and/or for generating electric power for the at least one hydraulic pump.

24 Claims, 5 Drawing Sheets

U.S. PATENT DOCUMENTS

| | | | | |
|---|---|---|---|---|
| 5,499,954 | A * | 3/1996 | Wagner et al. | 477/174 |
| 5,720,358 | A * | 2/1998 | Christensen et al. | 180/53.4 |
| 6,026,921 | A * | 2/2000 | Aoyama et al. | 180/65.25 |
| 6,223,842 | B1 * | 5/2001 | Masaki | 180/65.23 |
| 6,380,637 | B1 * | 4/2002 | Hsu et al. | 290/1 R |
| 6,584,710 | B1 * | 7/2003 | Lin et al. | 37/348 |
| 6,638,022 | B2 * | 10/2003 | Shimabukuro et al. | 417/2 |
| 6,705,030 | B2 * | 3/2004 | Tokunaga | 37/348 |
| 6,834,737 | B2 | 12/2004 | Bloxham | 180/165 |
| 6,851,207 | B2 * | 2/2005 | Yoshimatsu | 37/348 |
| 6,881,167 | B2 * | 4/2005 | Inada | 475/5 |
| 6,976,934 | B2 * | 12/2005 | Komeda et al. | 477/5 |
| 7,351,182 | B2 * | 4/2008 | Kobayashi | 477/5 |
| 7,472,769 | B2 * | 1/2009 | Yamanaka et al. | 180/65.25 |
| 7,673,713 | B2 * | 3/2010 | Betz et al. | 180/65.21 |
| 7,708,095 | B2 * | 5/2010 | Hirata | 180/65.275 |
| 7,878,281 | B2 * | 2/2011 | Tanishima | 180/65.265 |
| 7,892,139 | B2 * | 2/2011 | Kaltenbach | 477/5 |
| 2002/0050259 | A1 * | 5/2002 | Kojima | 123/179.3 |
| 2002/0079149 | A1 * | 6/2002 | Kotre et al. | 180/65.3 |
| 2002/0107618 | A1 * | 8/2002 | Deguchi et al. | 701/22 |
| 2002/0123409 | A1 * | 9/2002 | Suzuki et al. | 477/3 |
| 2002/0148144 | A1 * | 10/2002 | Tokunaga | 37/348 |
| 2003/0153429 | A1 * | 8/2003 | Boll | 477/6 |
| 2004/0009842 | A1 * | 1/2004 | Inada | 477/5 |
| 2006/0174624 | A1 * | 8/2006 | Grabowski et al. | 60/709 |
| 2006/0179690 | A1 * | 8/2006 | Ikari | 37/348 |
| 2006/0201147 | A1 * | 9/2006 | Nakamura et al. | 60/445 |
| 2007/0029122 | A1 * | 2/2007 | Suzuki | 180/65.2 |
| 2008/0064560 | A1 * | 3/2008 | Popp et al. | 477/5 |
| 2008/0223631 | A1 * | 9/2008 | Filla et al. | 180/65.1 |
| 2010/0036568 | A1 * | 2/2010 | Filla | 701/50 |
| 2010/0089050 | A1 * | 4/2010 | Filla | 60/433 |
| 2010/0094492 | A1 * | 4/2010 | Filla | 701/22 |

FOREIGN PATENT DOCUMENTS

| | | |
|---|---|---|
| DE | 19917665 A1 | 10/2000 |
| DE | 10246839 A1 | 4/2004 |
| EP | 0510582 A2 | 10/1992 |
| EP | 1288505 A1 | 3/2003 |
| EP | 1571352 A1 | 7/2005 |
| JP | 2005133319 A | 5/2005 |

OTHER PUBLICATIONS

International Search Report from corresponding International Application PCT/SE2005/001539.

International Preliminary Report on Patentability for corresponding International Application PCT/SE2005/001539.

* cited by examiner

WORKING MACHINE WITH ONE OR MORE ELECTRIC MACHINES FOR DRIVING, BRAKING, AND/OR GENERATING POWER AND A METHOD FOR OPERATING SUCH A WORKING MACHINE

BACKGROUND AND SUMMARY

The invention relates to a working machine and a method for operating a working machine.

The invention is applicable on working machines within the field of industrial construction machines, in particular wheel loaders. Although the invention will be described with respect to a wheel loader, the invention is not restricted to this particular vehicle, but may also be used in other heavy working machines, such as articulated haulers, trucks and excavators.

A wheel loader is usually provided with an internal combustion engine, a transmission line, and a gearbox for supplying torque to the driving wheels of the wheel loader. The gearbox provides different gear ratios for varying the speed of the vehicle, and for changing between forward and backward driving direction. The transmission line comprises a hydrodynamic torque converter arranged between the internal combustion engine and the gearbox. The torque converter is used to increase the torque during particularly heavy working operations, such as filling the bucket or acceleration of the wheel loader. The torque converter can very quickly adapt the output torque to the current working conditions. However, the torque converter has often a very low efficiency which is also dependent on the current driving conditions. The efficiency can be increased if the torque converter is provided with a lock-up function which can be used for direct operation. However, the gear ratio is fixed (1:1) in the lock-up state, and the problem of low efficiency remains during working operations where such a lock-up function cannot be used.

In addition to supply torque to the driving wheels, the internal combustion engine has to supply energy to a hydraulic pump of a hydraulic system of the wheel loader. Such a hydraulic system is used for lifting operations and/or steering the wheel loader. Hydraulic working cylinders are arranged for lifting and lowering a lifting arm unit, on which a bucket or other type of attachment or working tool, for example forks, is mounted. By use of another hydraulic working cylinder, the bucket can also be tilted or pivoted. Further hydraulic cylinders known as steering cylinders are arranged to turn the wheel loader by means of relative movement of a front and rear body part of the wheel loader.

On one hand, the rotation speed of the internal combustion engine has to be adapted to the hydraulic pump, and on the other hand, the internal combustion engine has to be adapted to the need for a very high torque, for example during filling the bucket when the speed of the wheel loader is close to zero. A rotation speed of the internal combustion engine determined by the hydraulic system means that the wheel loader has to be braked so as to adapt the velocity of the wheel loader to the current conditions. In order to fulfill the demands on speed of rotation and torque in different situations, the internal combustion engine has to be dimensioned for an unnecessary high effective output which output is not required or is only infrequently required. The use of an internal combustion engine which in some respects is oversized and further has to be driven during circumstances where the torque converter has low efficiency, and/or during conditions where the wheel loader has to be braked due to the hydraulic system, will result in high fuel consumption.

It is desirable that the invention is to provide a working machine of the kind referred to in the introduction, which working machine enables a more effective operation of the working machine and lower fuel consumption.

By the provision of a transmission line comprising an electric machine for driving or braking the driving wheels, and/or for generating electric power for the hydraulic pump, the internal combustion engine can be more efficiently used, which enables a smaller internal combustion engine to be used, and the fuel consumption can be lowered. For example, the hydraulic system can be driven at least partly by the electric machine instead of the internal combustion engine. Thus, the rotation speed of the internal combustion engine does not need to be determined taking the hydraulic pump into consideration. The electric machine can be used as a brake during a braking operation of the wheel loader, and at the same time function as a generator for recuperating energy. The energy can be directly supplied to the hydraulic system or stored in an electric energy storage means, such as a battery or super capacitor, to be used later on. If a great traction force is required, an additionally torque can be supplied to the driving wheels by means of the electric machine functioning as a electric motor, and, thus the need of the torque converter is decreased.

Furthermore, the electric machine can be used for driving the driving wheels in the reversed direction. This means that the reverse gear of the gearbox can be eliminated. A further advantage is that the electric machine can be used for adapting the speed of rotation of the internal combustion engine and the speed of rotation of the transmission line to each other so as to facilitate coupling or decoupling of a direct operation state of a transmission unit comprised in the transmission line.

By such a method the size and operation of the internal combustion engine can be optimized so as to keep the fuel consumption as low as possible.

Further advantages and advantageous features of the invention are disclosed in the following description.

By the term "electric machine" is meant a combined electric motor and generator. The electric machine can be driven by electricity to supply an output torque on a shaft or be mechanically driven by applying torque on a shaft for producing electricity.

The term "transmission unit" comprises hydraulic clutches, both hydrodynamic clutches such as torque converters and hydrostatic clutches, as well as mechanical clutches. Thus, "transmission unit" comprises both torque converters which can increase the torque, and ordinary clutches only used for disengagement and direct operation with the gear ratio of 1:1.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
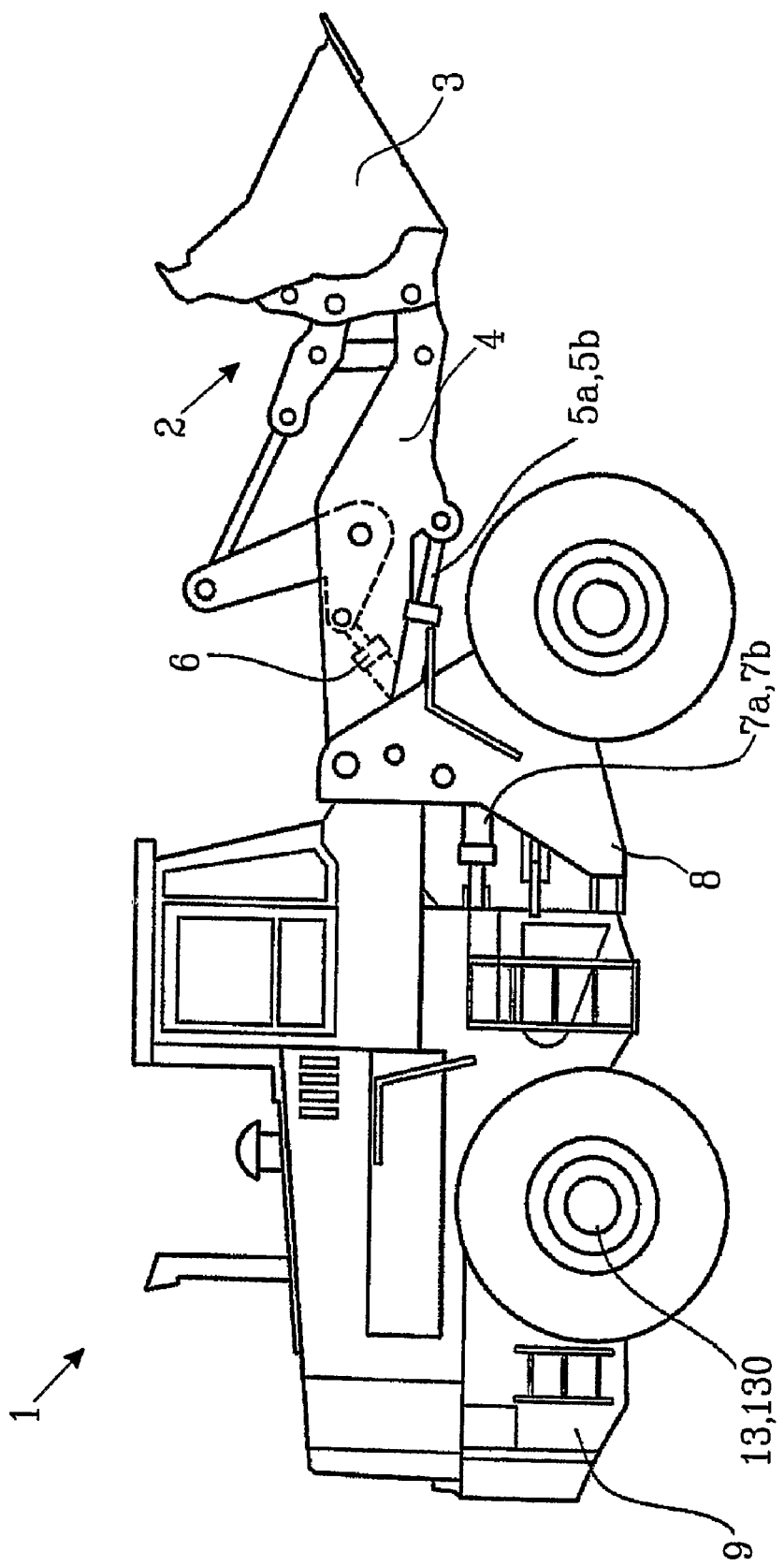
FIG. 1 is a lateral view illustrating a wheel loader having a bucket for loading operations, and a hydraulic system for operating the bucket and steering the wheel loader.
Figure 2:
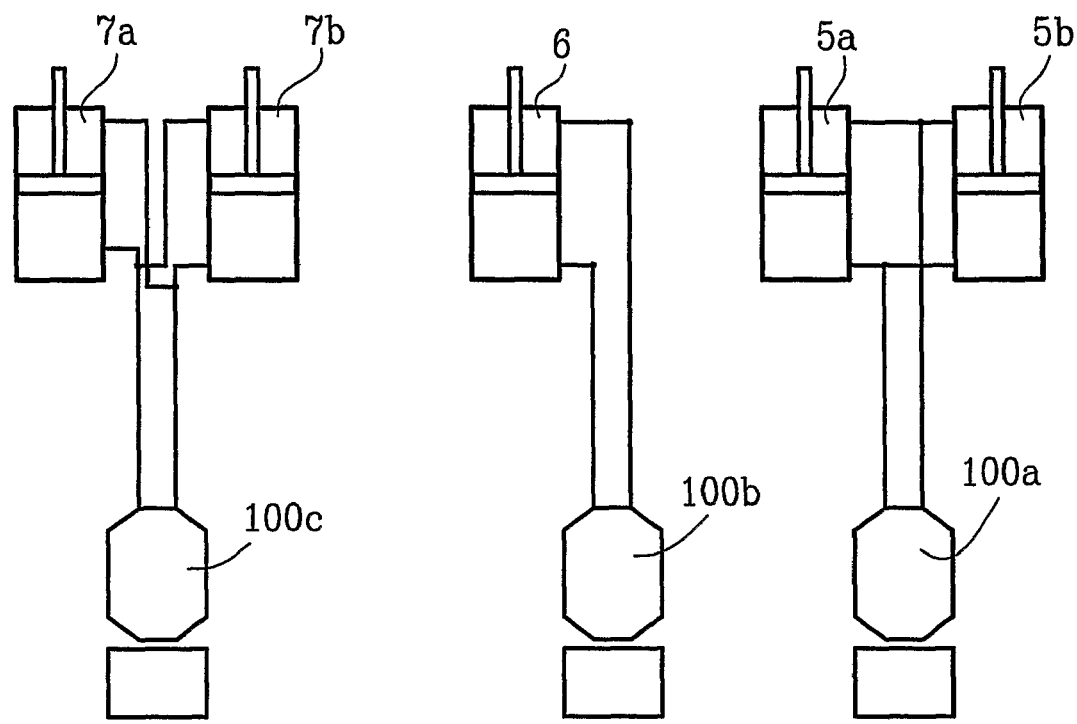
FIG. 2 is a schematic illustration of a hydraulic system for a wheel loader.

FIG. 1 is an illustration of a wheel loader 1 having an implement 2 in the form of a bucket 3. The bucket 3 is arranged on an arm unit 4 for lifting and lowering the bucket 3, and further the bucket 3 can be tilted or pivoted relative to the arm unit 4. The wheel loader 1 is provided with a hydraulic system comprising at least one hydraulic pump (not shown in FIG. 1) and working cylinders 5a, 5b, 6 for the operation of the arm unit 4 and the bucket 3. Furthermore, the hydraulic system comprises working cylinders 7a, 7b for turning the wheel loader by means of relative movement of a front body 8 and a rear body 9. A schematic illustration of such a hydraulic system is shown in FIG. 2. In the embodiment illustrated in FIG. 2, two working cylinders known as lifting cylinders 5a, 5b are arranged for lifting and lowering the arm unit 4, and a further working cylinder known as tilting cylinder 6 is arranged for tilting-in or tilting-out the bucket 3 relative to the arm unit 4. In addition, two working cylinders known as the steering cylinders 7a, 7b are arranged for steering the wheel loader 1. Furthermore, three hydraulic pumps 100a, 100b, 100c supply the hydraulic cylinders with hydraulic oil. An operator of the working machine can control the working cylinders by means of instruments connected to a control unit (not shown).

Figure 3:
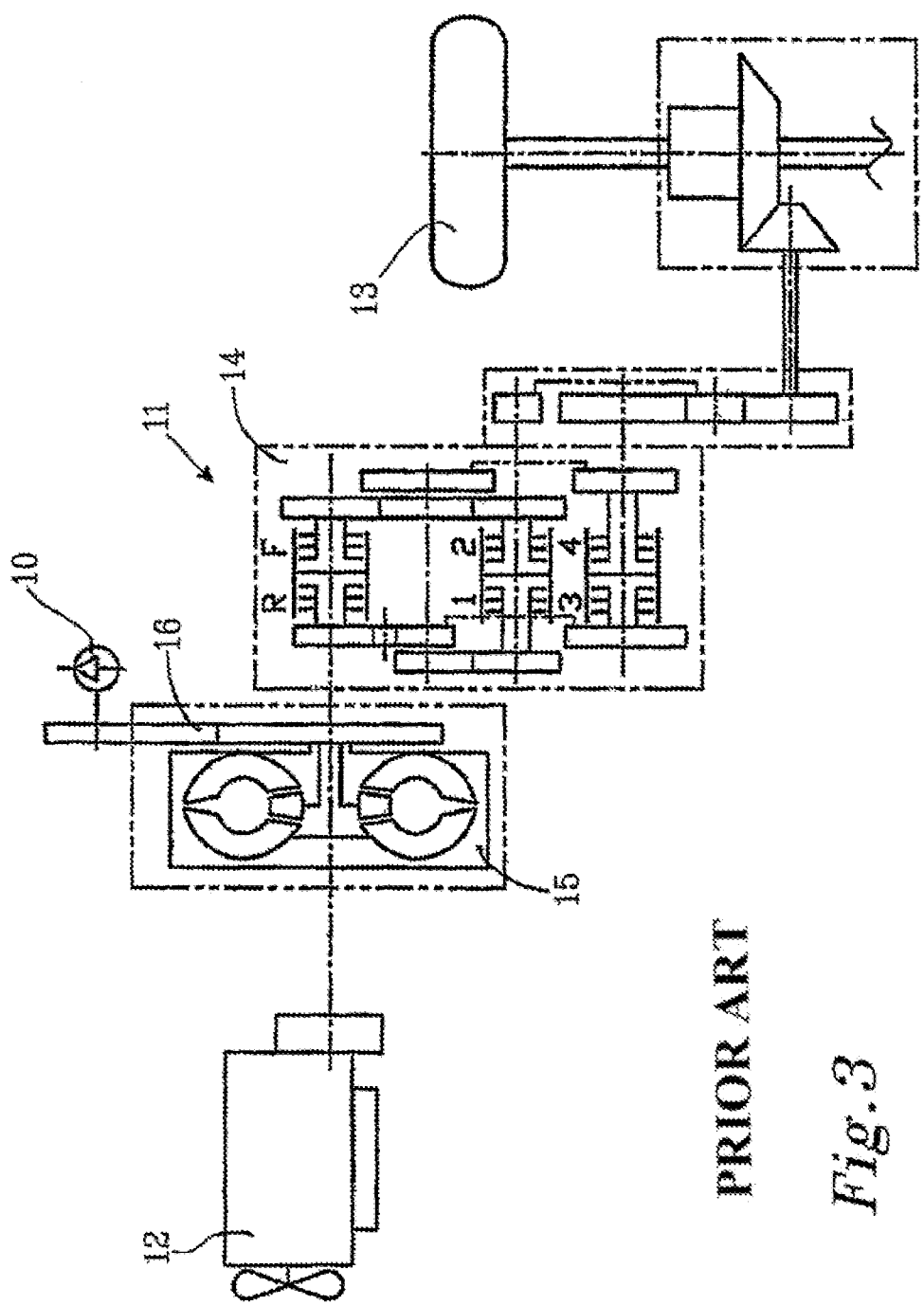
FIG. 3 is a schematic illustration of a transmission line of a wheel loader according to prior art.

FIG. 3 is a schematic illustration of a transmission line 11 of a wheel loader 1 according to prior art. At one end of the transmission line 11 an internal combustion engine 12 is arranged. The other end of the transmission line 11 is coupled to the driving wheels 13 of the wheel loader 1. The internal combustion engine 12 supplies torque to the driving wheels 13 of the wheel loader 1 via the transmission line 11. As illustrated, the transmission line 11 may comprise a gearbox 14 for varying the speed of the vehicle 1, and for changing between forward and backward driving direction of the wheel loader 1. A hydrodynamic converter 15 is arranged between the internal combustion engine 12 and the gearbox 14. The transmission line 11 of the wheel loader 1 has means for driving a hydraulic pump 10 in a hydraulic system for lifting operations and steering the wheel loader 1. According to prior art the hydraulic pump 10 is driven by the internal combustion engine 12, preferably via gear wheels 16 arranged between the torque converter 15 and the gearbox 14.

Figure 4:
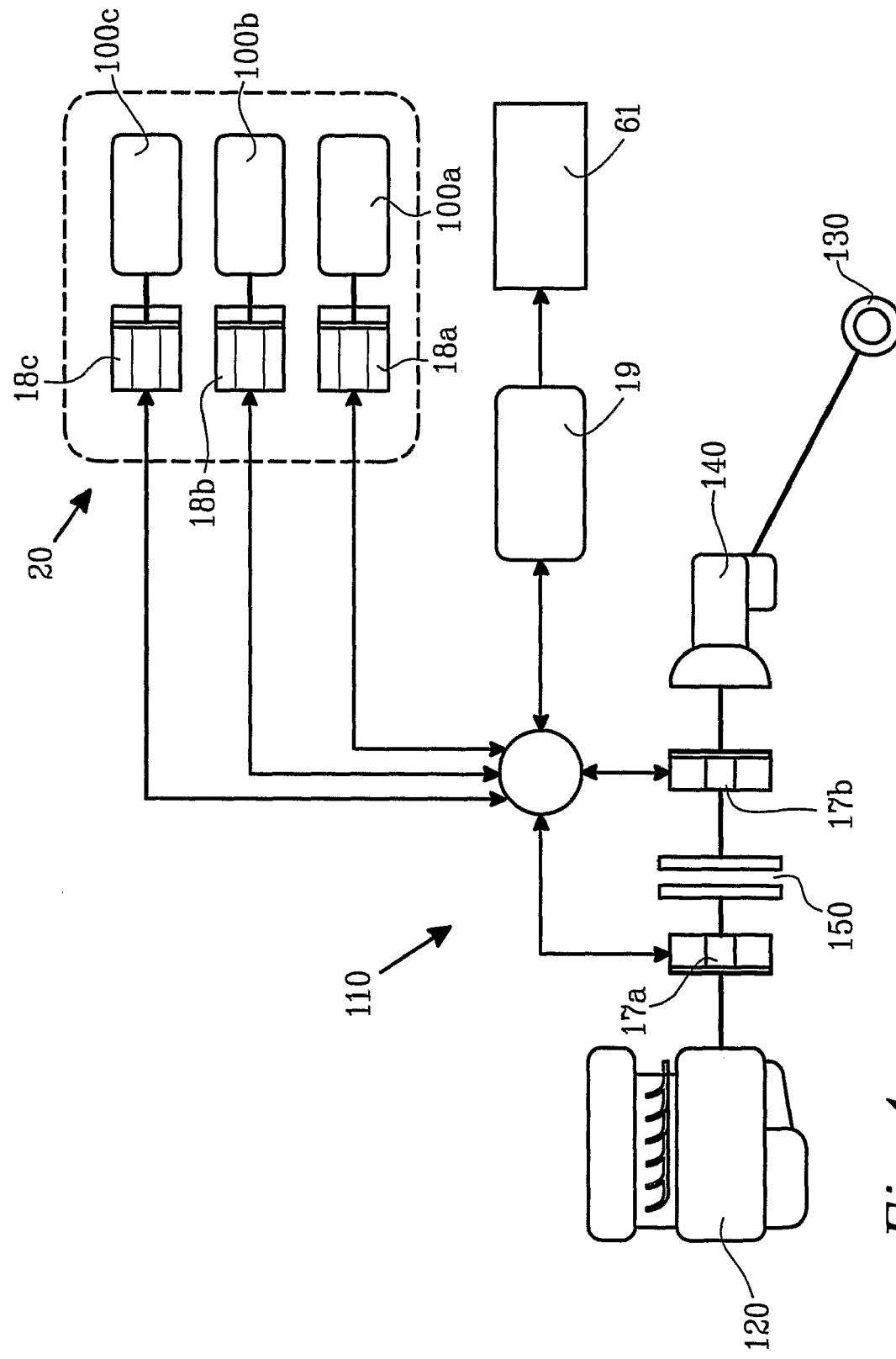
FIG. 4 is a schematic illustration of a transmission line of a working machine according to the invention.

A transmission line 110 of a working machine 1 according to the invention is schematically illustrated in FIG. 4. At one end of the transmission line 110 an internal combustion engine 120 is arranged. The other end of the transmission line 110 is coupled to the driving wheels 130 of the working machine 1. The internal combustion engine 120 supplies torque to the driving wheels 130 of the working machine 1 via the transmission line 110. As illustrated, the transmission line 110 may comprise a gearbox 140 for varying the speed of the vehicle 1, and for changing between forward and backward driving direction of the working machine 1. In the embodiment illustrated in FIG. 4, the transmission line 110 also comprises a transmission unit 150 for engagement and disengagement of the internal combustion engine 120 relative to the driving wheels 130. The transmission unit 150 is preferably a hydraulic clutch of the type called hydrodynamic torque converter. The torque converter is able to increase the torque, which means that the output torque of the torque converter can be for example in the interval 1-3 times the torque of the internal combustion engine 120. Furthermore, the torque converter has preferably a free wheel function and a lock-up function for direct operation without any increased torque. Thus, the transmission ratio of the torque converter in the lock-up state is fixed, and preferably substantially 1:1 However, in an alternative embodiment the transmission unit 150 could be an ordinary clutch for disengagement or direct operation without any increased torque. Such a clutch could be a hydraulic clutch as well as a mechanical clutch.

According to the invention, the transmission line 110 of the working machine 1 comprises at least one electric machine 17a, 17b for driving or braking the driving wheels 130, and/or for powering at least one hydraulic pump 100a, 100b, 100c by electricity.

Although the embodiment illustrated in FIG. 4 has three hydraulic pumps used for providing the functions described with reference to FIG. 2, in another embodiment one, two, four or more hydraulic pumps may be used in a hydraulic system 20 for providing these functions and/or other functions. In a preferred embodiment of the invention the working machine has at least two implement and/or steering functions, and at least one said hydraulic pump is arranged for each implement and/or steering function. In the embodiment examples schematically illustrated in FIGS. 2 and 4, the working machine comprises three hydraulic pumps 100a, 100b, 100c; a first hydraulic pump 100a is arranged to provide a lifting and lowering function of the implement, a second hydraulic pump 100b is arranged to provide a tilting function of the implement, and a third hydraulic pump 100c is arranged to provide the steering function of the working machine. By separate hydraulic pumps for these functions the operation of the working machine can be further optimized and thus the total energy consumption can be lowered.

The electric machines 17a, 17b are electrically connected to the hydraulic pumps 100a, 100b, 100c which has a respective motor 18a, 18b, 18c driven by electricity. The electric machines 17a, 17b can be connected directly to the hydraulic pumps as well as connected to an electric energy storage means 19, such as a battery or a super capacitor, which in turn is connected to the hydraulic pumps. The working machine 1 preferably comprises such an electric energy storage means 19 for storing energy and providing energy to the hydraulic pumps or to the electric machines 17a, 17b. Furthermore, conventional control units (not shown) can be used to control the energy transfer in different parts of the system illustrated in FIG. 4. As described in connection to the FIGS. 1 and 2, the working machine 1 can have an implement 2 in the form of a bucket 3 which is operated by means of the hydraulic system 20. However, it should be emphasised that also other implements are naturally usable. When applying the invention on a working machine such as an articulated hauler or a truck, the implement can instead be for example a dump body. Usually a hydraulic pump and working cylinders are used for the operation of the dump body during the dumping movement.

Preferably, the transmission line 110 comprises two electric machines 17a, 17b, one 17a of which is arranged upstream the transmission unit 150 and the second 17b is arranged downstream the transmission unit 150. By using two electric machines the number of possible operation modes is increased. In the embodiment illustrated in FIG. 4, the transmission line comprises one first electric machine 17a arranged between the internal combustion engine 120 and the transmission unit 150, and one second electric machine 17b arranged between the transmission unit 150 and the gearbox 140. The electric machines 17a, 17b are electrically connected to each other for transmitting torque from the internal combustion engine 120 to the driving wheels 130 via the first and second electric machines 17a, 17b. Furthermore, the electric machines are electrically connected to the electric energy storage means 19 and to the respective motor 18a, 18b, 18c of the hydraulic pumps. The first electric machine 17a can be driven by the internal combustion engine 120 for supplying energy directly to the hydraulic pumps or to the electric energy storage means 19, or to the second electric machine 17b. The second electric machine 17b can be used to brake the driving wheels 130 of the working machine 1 during a brake operation of the working machine and for supplying energy directly to the hydraulic pumps or to the electric energy storage means 19. The first electric machine 17a or the second electric machine 17b can also be powered by the electric energy storage means 19 in order to drive the driving wheels 130 of the working machine 1, or the second electric machine 17b can be powered by the first electric machine 17a for the same reason.

Although, a transmission line 110 comprising two electric machines is preferred, nevertheless advantages can be obtained by using one electric machine only, preferably arranged between the transmission unit and the driving wheels, and upstream any gearbox, i.e. between the transmission unit and the gearbox in the same way as the second electric machine 17b is arranged in FIG. 4. It is also possible to use one said electric machine for each driving wheel. In such a case, usually four electric machines are used for driving four driving wheels. Each electric machine is then preferably connected to the respective driving wheel via a respective gear box similar to what is shown for another embodiment in FIG. 5.

Furthermore, it would be possible to combine the prior art technique where the hydraulic pump is driven by the internal combustion engine, for example such as described in connection with FIG. 3, with an electric machine for driving the hydraulic pump. Then, the hydraulic pump can be driven by the internal combustion engine and/or the electric machine at different times so as to optimize the operation.

In addition, the energy stored by the electric energy storage means 19 may in some cases be used for other functions 61 of the wheel loader, such as compressors, fans, actuators, etc.

According to the method of the invention for operating a working machine 1, at least one electric machine 17a, 17b comprised in the transmission line 110 is used to drive or brake the driving wheels 130 and/or generate electric power for said at least one hydraulic pump 100a, 100b, 100c. In addition to the advantages obtained by operating the hydraulic pumps by means of power from one or more electric machines 17a, 17b, the electric machine 17a, 17b can be used for supplying torque to the driving wheels 130. By adapting the use of the internal combustion engine 120 and/or the electric machine/machines 17a, 17b to the current conditions, the total efficiency of the transmission line 110 can be increased.

With reference to FIG. 4, the driving wheels 130 can be driven by:

The internal combustion engine 120 together with lock-up or torque converter 150, or the internal combustion engine 120 and/or the first electric machine 17a and/or the second electric machine 17b together with lock-up or torque converter 150, or the first electric machine 17a and the second electric machine 17b without lock-up or torque converter 150, or by the second electric machine 17b without lock-up or torque converter 150.

The first electric machine 17a can be driven by the internal combustion engine 120 for generating electricity or by the electric energy storage means 19 for providing torque, and the second electric machine 17b can be driven by the first electric machine 17a or the electric energy storage means 19 for providing torque. The torque converter 150 could be replaced by an ordinary hydraulic or mechanical clutch, offering the same alternatives as for the lock-up state of the hydrodynamic torque converter.

It is further desirable that the invention is to provide a working machine comprising an electric power generating motor for supplying electricity to the working machine, the working machine further comprising at least one hydraulic pump in a hydraulic system for moving an implement arranged on the working machine and/or steering the working machine, which working machine enables a more effective operation of the working machine and lower energy consumption.

By the provision of at least one electric machine for driving the driving wheels of the working machine and a motor which supplies energy in the form of electricity, wherein the electric power generating motor is arranged to supply electricity to said at least one electric machine and said at least one hydraulic pump, the energy from the electric power generating motor, for example an internal combustion engine provided with an generator, can be more efficiently used and the total energy consumption can be lowered. The hydraulic system can be driven, without the need of adapting the rotation speed of the electric power generating motor. Furthermore, the electric machine can be used as a brake during a braking operation of the working machine, such as a wheel loader, and at the same time function as a generator for recuperating energy. The energy from the electric power generating motor can be directly supplied to the electric machine and the hydraulic system or stored in an electric energy storage means, such as a battery or super capacitor, to be used later on.

Furthermore, the electric machine can be used for driving the driving wheels in the reversed direction. This means that the reverse gear of the gearbox can be eliminated.

Figure 5:
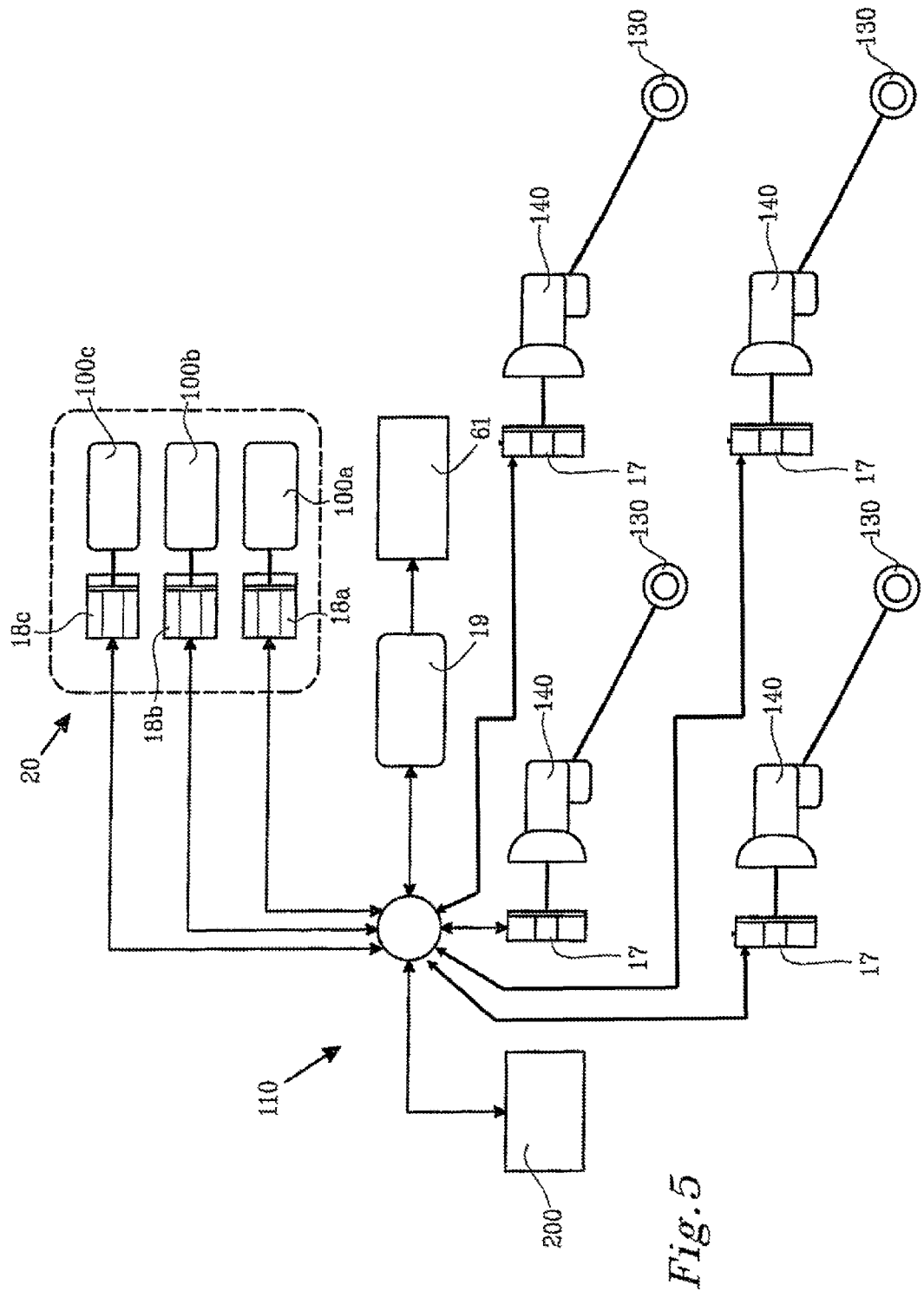
FIG. 5 is a schematic illustration of a variant of a transmission line of a working machine according to the invention.

In FIG. 5 a working machine comprising an electric power generating motor 200 for supplying electricity to the working machine is illustrated. The working machine comprises at least one hydraulic pump 100a, 100b, 100c in a hydraulic system for moving an implement arranged on the working machine and/or steering the working machine. The working machine further comprises at least one electric machine 17 for driving the driving wheels 130 of the working machine. The electric power generating motor 200 is arranged to supply electricity to said at least one electric machine 17 and said at least one hydraulic pump 100a, 100b, 100c.

The working machine illustrated in FIG. 5 can have one electric machine 17, however, as shown in FIG. 5, it is possible to use two or more electric machines. For example, the working machine may comprise one said electric machine for each driving wheel. In this case, usually four electric machines are used for driving four driving wheels. Each electric machine is preferably connected to the respective driving wheel via a respective gear box 140.

The working machine preferably comprises an electric energy storage means 19 for storing energy from the electric power generating motor 200 and/or from said at least one electric machine 17. This electric energy storage means 19 is then used to provide electricity to said at least one electric machine 17 and/or said at least one hydraulic pump 100a, 100b, 100c.

In addition to drive the driving wheels 130, one or more of said at least one electric machine 17 can be used to brake the driving wheels of the working machine during a brake operation of the working machine. At the same time the electric machine 17 can function as a generator for recuperating energy which energy can be stored in the electric energy storage means 19 and/or used for the hydraulic system 20.

In a preferred embodiment of the invention the working machine has at least two implement and/or steering functions, and at least one said hydraulic pump is arranged for each implement and/or steering function. In the embodiment examples schematically illustrated in FIGS. 2 and 5, the working machine comprises three hydraulic pumps 100a, 100b, 100c; a first hydraulic pump 100a is arranged to provide a lifting and lowering function of the implement, a second hydraulic pump 100b is arranged to provide a tilting function of the implement, and a third hydraulic pump 100c is arranged to provide the steering function of the working machine. By separate hydraulic pumps for these functions the operation of the working machine can be further optimized and thus the total energy consumption can be lowered.

Within the scope of the invention, the electric power generating motor 200 can be 35 designed in many different ways as long as it is able to provide electricity. One option is to use a fuel cell for providing electricity. Another example of an electric power generating motor is an internal combustion engine provided with an electric generator. A further solution is to use a gas turbine provided with an electric generator. The electric power generating motor can also be a free-piston engine provided with an electric generator.

It should be pointed out that throughout the application the term "driving wheels" is meant to comprise vehicle wheels for direct engagement with the ground as well as vehicle wheels for driving a ground engaging member, such as tracks, crawlers or similar.

It is to be understood that the present invention is not limited to the embodiments described above and illustrated in the drawings; rather, the skilled person will recognize that many changes and modifications may be made within the scope of the appended claims.

The invention claimed is:

1. A working machine comprising
   an internal combustion engine for supplying torque to driving wheels of the working machine,
   a transmission line arranged between the internal combustion engine and the driving wheels for transmitting torque from the internal combustion engine to the driving wheels, and
   at least a first and a second hydraulic pump in a hydraulic system for at least one of moving an implement arranged on the working machine and steering the working machine,
   wherein the transmission line comprises at least a first electric machine and a second electric machine, each for at least one of driving the driving wheels and braking the driving wheels and also for generating electric power for the at least first and second hydraulic pumps,
   wherein the transmission line comprises a transmission unit for engagement and disengagement of the internal combustion engine relative to the driving wheels,
   wherein the first electric machine is arranged between the internal combustion engine and the transmission unit,
   wherein the second electric machine is arranged between the transmission unit and the driving wheels and the second electric machine is arranged between the transmission unit and a gearbox,
   wherein the first and second electric machines are electrically connected to an electric enemy storage means,
   wherein the first hydraulic pump is exclusively powered by a first electric motor, and the second hydraulic pump is exclusively powered by a second electric motor, and
   wherein the first and second electric motors are electrically connected to at least one of the first and second electric machines and the electric energy storare means.

2. A working machine according to claim 1, wherein the working machine comprises at least one electric machine for each driving wheel.

3. A working machine according to claim 2, wherein the transmission unit is a hydrodynamic torque converter.

4. A working machine according to claim 3, wherein the hydrodynamic torque convener has a lock-up function where a transmission ratio of the torque converter is fixed.

5. A working machine according to claim 1, wherein the transmission unit is a mechanical clutch.

6. A working machine according to claim 5, wherein the transmission unit is a hydrodynamic torque converter, and wherein the hydrodynamic torque converter has a lock-up function where a transmission ratio of the torque converter is fixed, and wherein the working machine comprises a plurality of electric machines, and at least two of the electric machines are electrically connected to each other for transmitting torque from the internal combustion engine to the driving wheels via the at least two electric machines.

7. A working machine according to claim 1, wherein the electric energy storage means is arranged to provide energy to the at least one hydraulic pump.

8. A working machine according to claim 1, wherein the electric energy storage means is arranged to provide energy to at least one of the first and second electric machines.

9. A working machine according to claim 7, wherein at least one of the first and second electric machines is arranged to charge the electric energy storage means when the at least one of the first and second electric machines functions as a generator.

10. A working machine according to claim 1, wherein at least one of the first and second electric machines is arranged to brake the driving wheels of the working machine during a brake operation of the working machine.

11. A working machine according to claim 1, wherein at least one of the first and second electric machines is arranged to drive the driving wheels of the working machine during operation of the implement or during acceleration of the working machine.

12. A working machine according to claim 1, wherein at least one of the first and second electric machines is arranged to facilitate coupling or decoupling of a direct operation state of the transmission unit by adapting the rotation speed of the internal combustion engine and the rotation speed of the transmission line to each other.

13. A working machine according to claim 1, wherein the working machine is a wheel loader.

14. A working machine according to claim 1, wherein the working machine performs at least one implement function and at least one steering function, and at least one hydraulic pump is arranged for each function.

15. A working machine according to claim 14, wherein the working machine comprises three hydraulic pumps, a first hydraulic pump being arranged to provide a lifting and lowering function of the implement, a second hydraulic pump being arranged to provide a tilting function of the implement, and a third hydraulic pump being arranged to provide the steering function of the working machine.

16. A method for operating a working machine having an internal combustion engine for supplying torque to the driving wheels of the working machine, and a transmission line arranged between the internal combustion engine and the driving wheels for transmitting torque front the internal combustion engine to the driving wheels, the working machine further comprising at least a first and a second hydraulic pump in a hydraulic system for moving an implement arranged on the working machine and/or steering the working machine, comprising using at least one of a first and a second electric, machine in the transmission line to at least one of drive the driving wheels and brake the driving wheels and also to generate electric power for the at least one hydraulic pump, using a transmission unit in the transmission line for engagement and disengagement of the internal combustion engine relative to the driving wheels, using at least the second electric machine arranged between the transmission unit and the driving wheels and between the transmission unit and a gearbox and driving the driving wheels by the second electric machine, the second electric machine being electrically powered by at least the first electric machine in the transmission line and an electric energy storage means of the wheel loader, the first electric machine being arranged between the internal combustion engine and the transmission, exclusively driving the first hydraulic by a first electric motor and exclusively driving the second hydraulic pump by a second electric motor, and driving the first and second electric motors via an electrical connection to at least one of the first and second electric machines and the electric energy storage means.

17. A method according to claim 16, comprising driving the driving wheels by the first electric machine via the transmission unit.

18. A method according to claim 16, comprising driving the driving wheels of the working machine by at least one of the first and second electric machines during at least one of operation of the implement and acceleration of the working machine.

19. A method according to claim 16, comprising using at least one of the first and second electric machines for braking the driving wheels of the working machine during a brake operation of the working machine, and for recuperation of energy during the brake operation.

20. A method according to claim 16, comprising driving the driving wheels while using a hydrodynamic torque converter as a transmission unit.

21. A method according to claim 20, comprising driving the driving wheels during a lock-up state of the hydrodynamic torque converter.

22. A method according to claim 16, comprising using at least one of the first and second electric machines for driving the driving wheels in either of a clockwise or counterclockwise direction.

23. A method according to claim 16, wherein the first and second electric motors are each directly electrically connected to at least one of the first and second electric machines and the electric energy storage means, the method comprising driving the first and second electric motors via a direct electrical connection to any one of the first and second electric machines and the electric energy storage means.

24. A working machine according to claim 1, wherein the first and second electric motors are each directly electrically connected to at least one of the first and second electric machines and the electric energy storage means.

\* \* \* \* \*